(12) United States Patent
Weiher et al.

(10) Patent No.: US 7,570,471 B2
(45) Date of Patent: Aug. 4, 2009

(54) CIRCUIT BREAKER TRIP UNIT WITH ZONE SELECTIVE INTERLOCK AND SYSTEM MONITORING

(75) Inventors: Helmut Weiher, Burton, OH (US); Jeffrey W. Patterson, Oberlin, OH (US); Richard C. Fleischer, South Euclid, OH (US)

(73) Assignee: Utility Relay Company, Chagrin Falls, OH (US)

( * ) Notice: Subject to any disclaimer, the term of this patent is extended or adjusted under 35 U.S.C. 154(b) by 148 days.

(21) Appl. No.: 11/676,532

(22) Filed: Feb. 20, 2007

(65) Prior Publication Data

US 2008/0198521 A1 Aug. 21, 2008

(51) Int. Cl.
*H02H 3/001* (2006.01)
(52) U.S. Cl. .......................................... 361/64; 361/62
(58) Field of Classification Search .............. 361/62–69
See application file for complete search history.

(56) References Cited

U.S. PATENT DOCUMENTS

| | | | |
|---|---|---|---|
| 4,271,444 A * | 6/1981 | Howell ........................ | 361/48 |
| 4,464,697 A | 8/1984 | Sun | |
| 4,468,714 A | 8/1984 | Russell | |
| 4,689,708 A | 8/1987 | Hager et al. | |
| 4,706,155 A | 11/1987 | Durivage et al. | |
| 4,791,520 A | 12/1988 | Stegmuller | |
| 4,896,241 A | 1/1990 | Li et al. | |
| 4,996,646 A | 2/1991 | Farrington | |
| 6,160,690 A | 12/2000 | Matsumoto et al. | |
| 6,297,939 B1 | 10/2001 | Bilac et al. | |
| 6,313,975 B1 | 11/2001 | Dunne et al. | |
| 6,356,422 B1 | 3/2002 | Bilac et al. | |
| 6,369,995 B1 | 4/2002 | Kagawa et al. | |
| 6,714,395 B2 | 3/2004 | Meisinger, Sr. et al. | |
| 7,196,884 B2 * | 3/2007 | Guzman-Casillas et al. ... | 361/36 |
| 2003/0231440 A1 | 12/2003 | Papallo et al. | |
| 2004/0130837 A1 | 7/2004 | Papallo et al. | |
| 2004/0130838 A1 | 7/2004 | Papallo et al. | |

OTHER PUBLICATIONS

International Search Report dated Nov. 9, 2007.

* cited by examiner

*Primary Examiner*—Danny Nguyen
(74) *Attorney, Agent, or Firm*—Pearne & Gordon LLP

(57) ABSTRACT

A zone-selective-interlocking system for an electrical power distribution system that has at least one upstream breaker and at least one downstream breaker is provided. Each breaker in the power distribution system has a zone-selective-interlocking circuit that includes a zone-selective-interlocking-input circuit and a zone-selective-output circuit. The zone-selective-interlocking system also includes a monitoring device to monitor the voltage sent from the zone-selective-interlocking-output circuit of the at least one downstream breaker to the zone-selective-interlocking-input circuit of the at least one upstream breaker and determine whether there is a proper or improper connection between the upstream and downstream breaker and whether the downstream breaker is sending a restraint signal to the upstream breaker.

22 Claims, 3 Drawing Sheets

CIRCUIT BREAKER TRIP UNIT WITH ZONE SELECTIVE INTERLOCK AND SYSTEM MONITORING

FIELD OF INVENTION

The present invention relates to circuit breaker protection in the electrical power distribution industry and more specifically to a zone selective interlocking system having a signal-monitoring system to verify the interconnection of upstream and downstream circuit breakers.

BACKGROUND OF THE INVENTION

Zone selective interlocking (ZSI) systems have been available in the electrical power distribution industry for many years. The standard electrical power system protection provides selective-protective coordination between an upstream (main) breaker and the downstream (feeder) breakers. Thus, in the event of a fault (e.g. a short circuit, ground fault or an overload) the standard protection system selectively coordinates the upstream and downstream breakers so that the nearest downstream breaker will clear the fault before the upstream breaker opens. Therefore, because a downstream breaker nearest to the fault clears the fault a minimal number of feeders are de-energized.

Selective-protective coordination between upstream and downstream breakers is achieved by adding an additional time delay to the trip unit of the upstream breaker to thereby give the downstream breaker time to interrupt the fault. The ZSI system adds to the standard selective-protective coordinated system by allowing the upstream breaker to identify a fault within its zone (ahead of the feeder breakers) and clear this fault without adding the time delay required by selective-protection coordination. More specifically in a selectively coordinated protective system with ZSI, when a downstream breaker detects a current greater than its ground fault (GF) pick-up, short time (ST) pick-up or its instantaneous (I) pick-up it will send a restraint signal back to the upstream breaker. The upstream breaker, upon seeing the restraint signal, will begin to time out based on its normal selective-coordination GF or ST time-delay-trip setting. In a first scenario, if the downstream breaker operates properly it will trip thereby clearing the fault. Further, the upstream breaker will stop timing its GF or ST time-delay-trip setting and, thus, will not trip. In this first scenario, the downstream breaker cleared the fault and a minimal number of feeders were affected. In a second scenario, if the downstream breaker detects the fault and sends a restraint signal to the upstream breaker but the downstream breaker does not operate properly to clear the fault the GF or ST time-delay-trip setting on the upstream breaker will time out and the upstream breaker will trip thereby clearing the fault. Thus, the upstream breaker acts as a back up breaker to the downstream breaker in the event that the downstream breaker does not operate properly. In this second scenario, however, all feeders downstream from the tripped upstream breaker are de-energized. In a third scenario, if the upstream breaker with ZSI detects a GF or ST fault and does not receive a ZSI restraint signal from a downstream breaker, the upstream breaker will assume that the fault is in its protection zone (ahead of the feeder breakers) and will ignore its GF or ST time-delay-trip settings and will trip with minimal time delay thereby quickly clearing the fault. In this third scenario, if the ZSI signal connection between the downstream breaker and the upstream breaker were improperly connected, damaged or somehow malfunctioning, the upstream breaker would never receive a restraint signal and would always consider a fault to be within its zone and trip without a time delay on a GF or ST fault even if a downstream breaker was also in the process of clearing the fault. The improper or damaged ZSI signal connection, however, would not be detected until a fault occurred and the upstream breaker tripped with minimal delay thereby not only clearing the fault but also de-energizing all downstream feeders connected to the upstream breaker. In this scenario the selective-protective coordination of the power distribution system is totally lost. Thus, what is required is a ZSI system with a monitoring system to verify the ZSI signal interconnection between the upstream and downstream breakers that will: 1) override the non-coordination function of an upstream breaker in a ZSI system and 2) create an error message and alarm in the event of an improper or damaged ZSI signal connection between the upstream and downstream breakers.

BRIEF SUMMARY OF THE INVENTION

In accordance with one aspect, a zone-selective-interlocking system for an electrical power distribution system has at least one upstream breaker and at least one downstream breaker. A zone-selective-interlocking circuit is connected to the at least one upstream breaker and the at least one downstream breaker. A monitoring portion verifies the connection of the zone-selective-interlocking circuit to the at least one upstream breaker and the at least one downstream breaker.

In accordance with another aspect, a method of verifying a connection between at least one upstream breaker and at least one downstream breaker in a power distribution system includes the steps of providing a zone-selective-interlocking system connected to the at least one upstream breaker and the at least one downstream breaker; determining if an input or output of a zone-selective-interlocking circuit at the downstream breaker is set to an ON position; measuring a ZSI signal at the input or output; determining if there is an open connection between the at least one upstream breaker and the at least one downstream breaker based on the determining and measuring step results; and effecting an alarm if there is an open connection thereby informing an operator of the open connection.

Additional features, benefits or advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

The invention may take physical form in certain parts and arrangement of parts, a preferred embodiment of which will be described in detail in this specification and illustrated in the accompanying drawings that form a part of the specification.

DETAILED DESCRIPTION OF THE OF THE INVENTION

Figure 1:
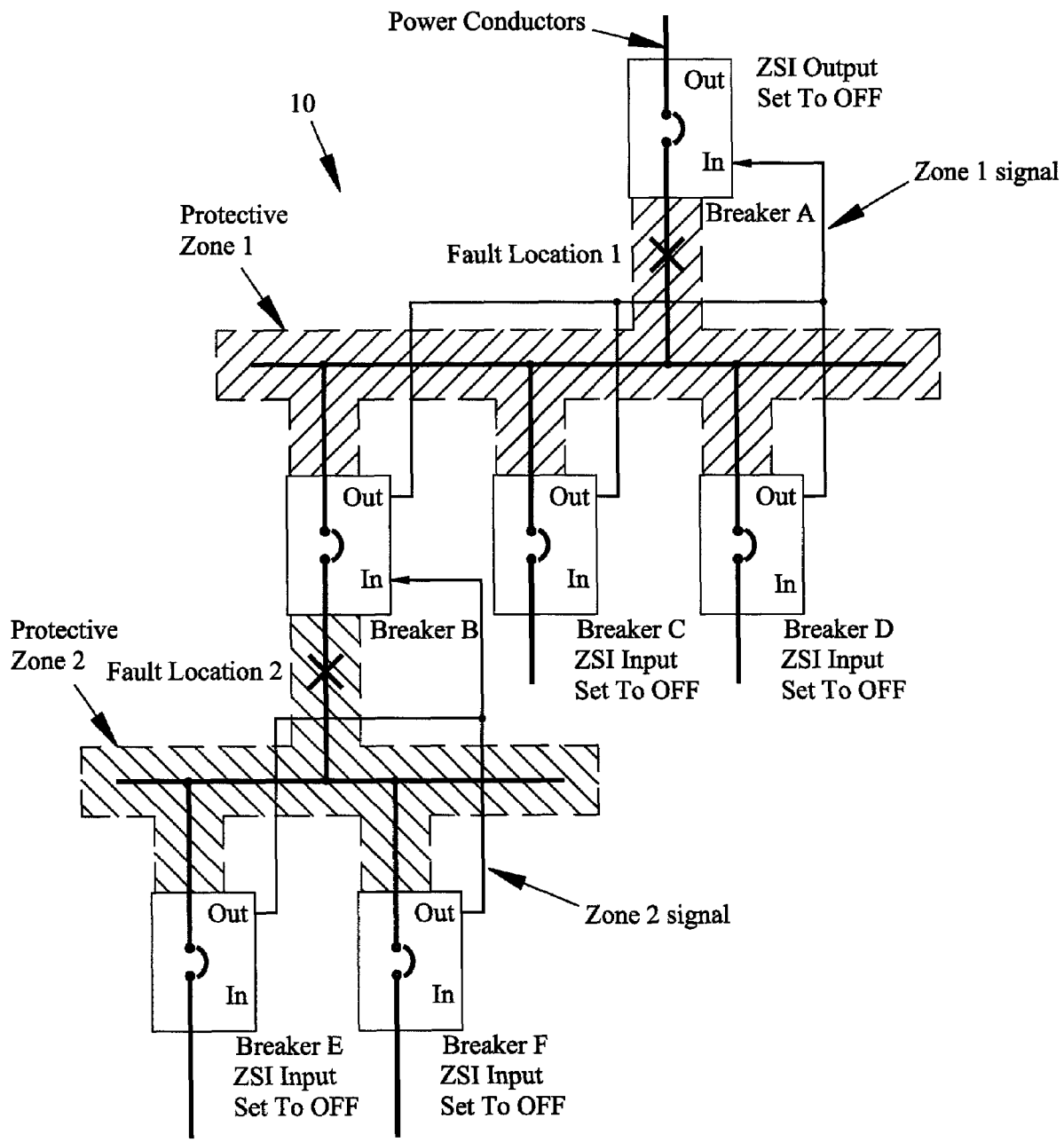
FIG. 1 is a schematic of a typical electrical power distribution system having multiple ZSI zones.

Referring now to the drawings, FIG. 1 shows an electrical power distribution system 10 having two ZSI zones, designated as protective Zone 1 and protective Zone 2. Breaker A serves as an upstream breaker to the downstream breakers in both Zone 1 and Zone 2, which include breakers B, C, and D in Zone 1 and breakers E and F in Zone 2. Further, breaker B also serves as an upstream breaker to downstream breakers E and F in Zone 2.

Figure 2:
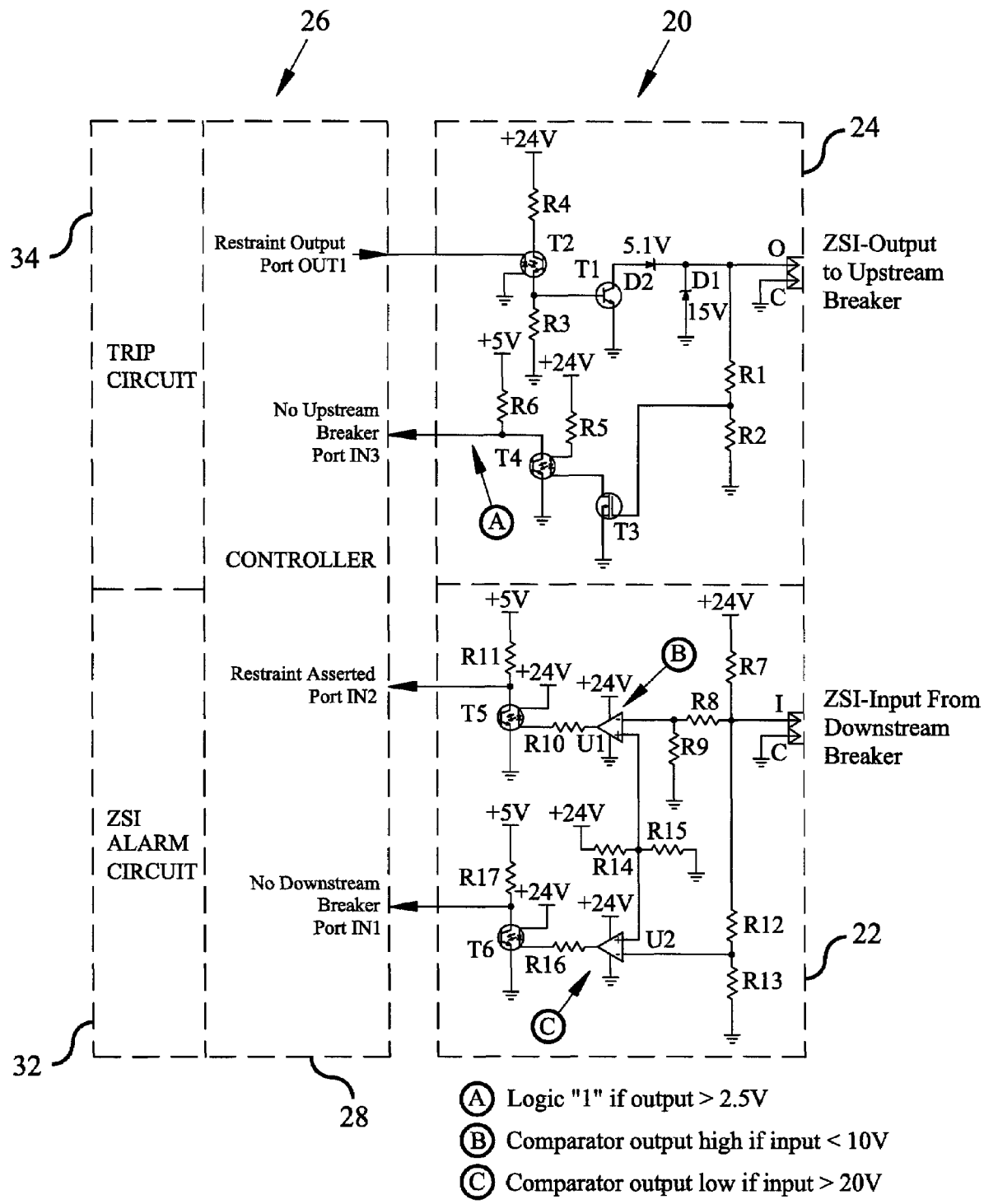
FIG. 2 is a schematic of a basic ZSI circuit in accordance with the present invention.

Referring to FIGS. 1 and 2, each breaker A-F includes a ZSI monitoring circuit 20 comprised of a ZSI-input circuit 22 and a ZSI-output circuit 24. The ZSI circuits 20 on the upstream and downstream breakers communicate with each other, as described herein, to provide minimum time delay tripping for faults within the protective zone of an upstream breaker and provide selective-protective coordination between the upstream and downstream breakers for faults outside of the protective zone of the upstream breaker. Thus, in the event of a fault (e.g. a short circuit or a ground fault) at fault location 2, the ZSI circuits 20 of breakers A and B will communicate with each other so that the upstream breaker A will trip with its preset time delay for the fault outside of its zone 1 and will trip without its preset time delay for a fault at fault location 1, which is within its zone. Therefore, due to the coordination between the ZSI circuits 20 an upstream breaker will trip without additional time delay for faults within its zone, which considerably reduces the energy released in the fault, reduces equipment damage and the risk to personnel.

Each ZSI-input circuit 22 has two ZSI-input terminals I, C and each ZSI-output circuit 24 has two ZSI-output terminals O, C, where C designates common. The ZSI-output terminals O, C of each of the downstream breakers are connected in parallel to the ZSI-input terminals I, C of its corresponding upstream breaker(s), as shown in FIG. 1. Thus, the ZSI-output terminals O, C of downstream breakers B-D are connected in parallel to the ZSI-input terminals I, C of upstream breaker A. Further, the ZSI-output terminals O, C of downstream breakers E and F are connected in parallel with the ZSI-input terminals I, C of upstream breaker B. Any breaker that does not have a downstream breaker connected to it must have its ZSI-input circuit 22 set to OFF in the controller 28. Any breaker having a downstream breaker connected to it should have it ZSI-input circuit 22 set to ON. Thus, because breakers C-F do not have a corresponding downstream breaker the ZSI-input circuit 22 to breakers C-F is set to the OFF position in the controller 28. In addition, any breaker that does not have an upstream breaker connected to it must have its ZSI-output circuit 24 set to the OFF position in controller 28. Any breaker having an upstream breaker connected to it should have its ZSI-input circuit 24 set to ON. Thus, because breaker A does not have a corresponding upstream breaker, its ZSI-output circuit 24 is set to the OFF position in controller 28.

Referring to FIG. 2, each breaker further includes a controller 28 electrically connected to the ZSI monitoring circuit 20. The ZSI-input circuit 22 is connected to the controller 28 through two logic signals IN1 and IN2. The ZSI-output circuit 24 is also connected to the controller 28 through two logic signals IN3 and OUT1. The controller 28 controls restraint of the upstream breaker via logic signal OUT1 by sending the upstream breaker a restraint signal.

Figure 3:
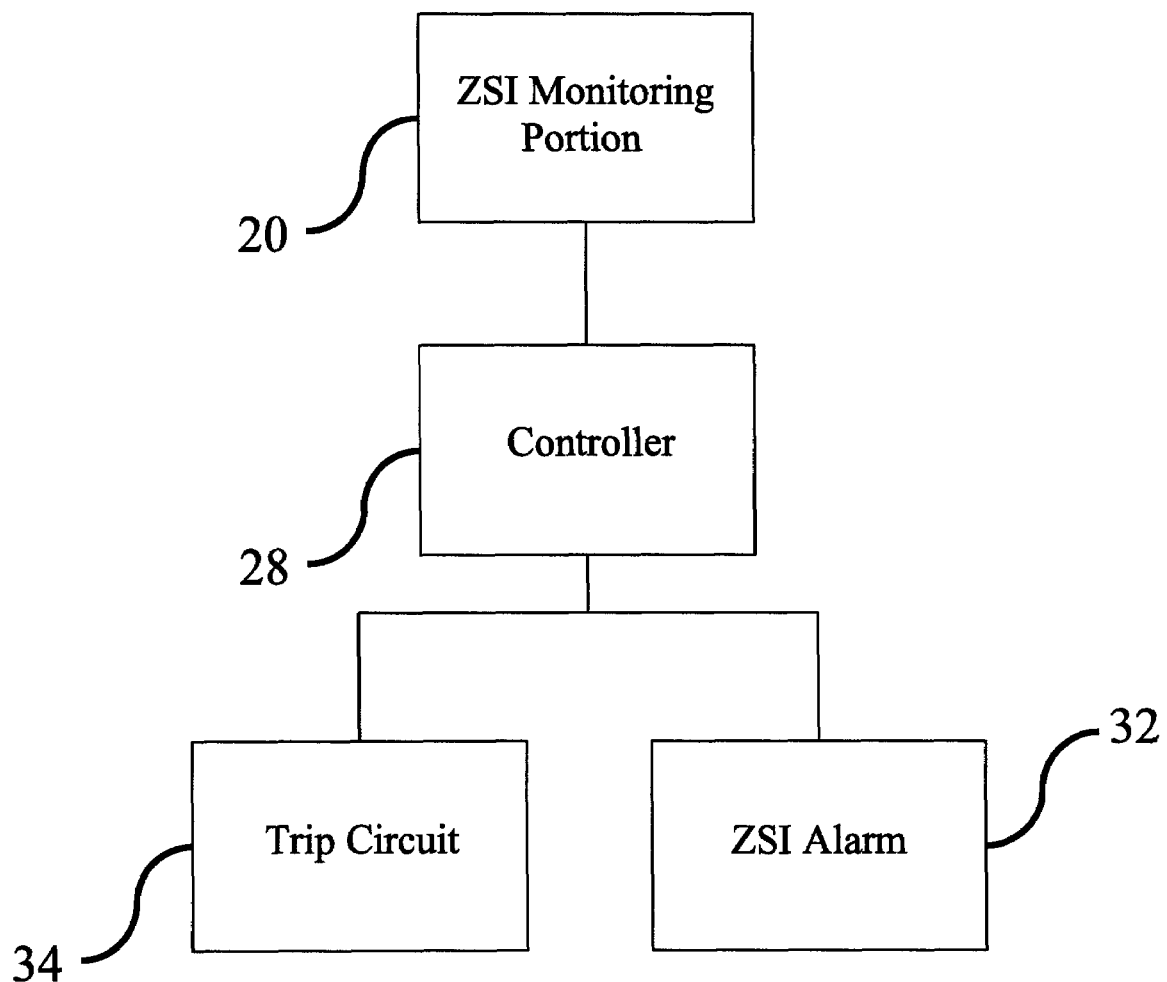
FIG. 3 is a block diagram of the ZSI circuit of a breaker in accordance with the present invention.

Referring to FIGS. 2 and 3, the ZSI system includes a monitoring portion 20 that monitors a signal, known as the "zone-selective-interlocking system signal" or "ZSI signal", to verify the integrity of the wiring between the upstream and downstream breakers. The monitoring portion 20 may be integrated into the controller 28, or in another embodiment may be a stand-alone device. The monitoring portion 20 may monitor any type of signal for ZSI communication known in the art such as, for example, voltage, current, power, etc. over two or more wires, analog or digital optical signals over one or more optical fibers or wireless signals transmitted by radio frequency. Thus, the monitoring portion 20 shown in FIGS. 2 and 3 is for illustrative purposes only and is not intended to limit the scope of the invention. In the embodiment shown in FIG. 2, two wires are shown and the monitoring portion 20 monitors a voltage at the input terminals I, C of the ZSI-input circuit 22 and at the output terminals O, C of the ZSI-output circuit 24. In this embodiment, four voltage levels are used for ZSI signal communications between the downstream and upstream breakers. The communications levels correspond to "no downstream connection", "proper connection", "restraint signal to upstream breaker(s)" and "no upstream connection". Specifically the voltage levels are approximately 24V, 15V, 6V and 0V with the monitoring portion 20 allowing for voltage tolerances. Other types of ZSI communications may use various current levels, light intensities, frequencies or digital values to communicate between breakers. The monitoring portion 20 measures the ZSI signal to verify the electrical connection between the ZSI-input circuit 22 of the upstream breaker and the ZSI-output circuit 24 of the downstream breaker. The ZSI signal is measured at the input terminals I, C of the ZSI-input circuit 22 and the output terminals O, C of the ZSI-output circuit 24 and the results are communicated to the controller 28, via ports IN1, IN2 and IN3 as described above. The value of the ZSI signal determines if there is a proper or improper connection between the upstream and downstream breaker and if the downstream breaker is sending a restraint signal to the upstream breaker. The controller 28 rejects any signals that are set to OFF. The electronic trip unit further includes a ZSI alarm 32 that may include a display. The controller 28 monitors the ZSI system and provides audible and/or visual notification to the operator through the ZSI alarm 32 when there is no connection between breakers in the event that a connection is expected. In the following explanation of the operation of the monitoring portion 20, it should be noted that the voltages and the component values disclosed below and shown in the FIGURES can be any voltage or current signals, analog or digital optical signals or signals transmitted by radio frequency commonly known in the art and that the voltages and values used in the description below and shown in the FIGURES are for illustrative purposes only. Likewise, connections can be made by wired or wireless means.

Referring to FIG. 2, if the ZSI signal voltage as seen at the input terminals I, C of the ZSI circuit 20 of the upstream breaker is, for example, approximately 24V, which produces a logic "0" on input IN1 to the controller 28, 1) there are no downstream breaker(s) connected to the upstream breaker and the ZSI-input on the upstream breaker should be set to OFF or 2) there are downstream breaker(s) connected to the upstream breaker and the ZSI-input on the upstream breaker is set to ON but the connection from the upstream breaker to the downstream breaker(s) is open. As shown in FIG. 1, breakers C through F are examples of scenario 1 above. In these breakers the ZSI-input is set to OFF and the voltage seen at the input terminals I, C of these breakers is 24V. The ZSI-input I is pulled up through a resistor R7 to 24V. In the second scenario, because the connection between the upstream and downstream breaker(s) is open the ZSI-input is pulled up through resistor R7 to 24V as in scenario 1. This condition can be used to effect an alarm that signals operation personnel that there is an improper or open connection or an improper setting.

If the downstream voltage as seen at the input terminals I, C of the ZSI circuit 20 of the upstream breaker is, for example, approximately 15V, which produces a logic "1" on input IN1 to the controller 28, then this breaker is an upstream breaker for a zone and at least one downstream breaker is properly connected. The 15V is generated from the Zener diode D1 located in the ZSI-output circuit 24 of the downstream breaker(s). When properly connected, the Zener diode D1 of the downstream breaker pulls the ZSI-input voltage of the upstream breaker down to 15V.

If the downstream voltage as seen at the input terminals I, C of the ZSI circuit 20 of the upstream breaker is, for example, approximately 6V, which produces a logic "1" on input IN2 to the controller 28, then this breaker is an upstream breaker for a zone and at least one downstream breaker has detected a fault and this downstream breaker is sending a restraint signal to the upstream breaker. In this case, the controller 28 in the downstream breaker that has detected the fault turns on the optically isolated transistor T2, via port OUT1, which turns on transistor T1 that pulls down its ZSI-output voltage to approximately 6V. Thus, the upstream breaker will time out based on its GF or ST time-delay-trip setting thereby giving the downstream breaker the time to clear the fault.

If the ZSI voltage as seen at the output terminals O, C of the ZSI circuit 20 of the downstream breaker is, for example, greater than approximately 2.5V then there is a good electrical connection between the upstream breaker and the downstream breaker and the ZSI circuit 24 of the downstream breaker produces a logic "0" on input IN3 to the controller 28.

If the ZSI voltage as seen at the output terminals of the ZSI circuit 20 of the downstream breaker is, for example, approximately 0V then either, 1) there is no upstream breaker and the ZSI-output is set to OFF (see, for example, breaker A in FIG. 1) or 2) the upstream breaker is not powered up, or 3) there is a connection to an upstream breaker and the ZSI-output is set to ON but there is an open ZSI connection between the downstream breaker and the upstream breaker. The ZSI circuit 24 of the downstream breaker produces a logic "1" on the input IN3 to the controller 28 and this condition can be used to effect an alarm that signals operation personnel that there is an improper or open connection or an improper setting.

While specific embodiments of the invention have been described and illustrated, it is to be understood that these embodiments are provided by way of example only and that the invention is not to be construed as being limited thereto but only by proper scope of the following claims.

What is claimed is:

1. A zone-selective-interlocking (ZSI) system for an electrical power distribution system having at least one upstream breaker and at least one downstream breaker comprising:
   a zone-selective-interlocking circuit connected to the at least one upstream breaker and the at least one downstream breaker; and
   a monitoring portion of the at least one upstream breaker to verify the connection of the zone-selective-interlocking circuit to the at least one upstream breaker and the at least one downstream breaker,
   wherein the monitoring portion of the at least one upstream breaker measures a signal level of a ZSI signal input of the at least one upstream breaker, and determines that an open circuit condition exists between the at least one upstream breaker and the at least one downstream breaker in the zone-selective-interlocking circuit based a measured first signal level of the ZSI signal input, determines that a proper connection condition exists between the at least one upstream breaker and the at least one downstream breaker in the zone-selective-interlocking circuit based on a measured second signal level of the ZSI signal input, and determines that both of a restraint signal is sent from the at least one downstream breaker to the at least one upstream breaker and that said proper connection condition exists based on a measured third signal level of the ZSI signal input.

2. The zone-selective-interlocking system of claim 1, wherein the monitoring portion measures a signal sent from the downstream breaker to the upstream breaker.

3. The zone-selective-interlocking system of claim 1, wherein the monitoring portion effects an alarm based on the measured first signal level.

4. The zone-selective-interlocking system of claim 1, wherein the restraint signal instructs the upstream breaker to trip at normal GF and ST time-delay-trip settings.

5. The zone-selective-interlocking system of claim 1, wherein the zone-selective-interlocking circuit further includes a zone-selective-interlocking-input circuit at the upstream breaker and a zone-selective-interlocking-output circuit at the downstream breaker.

6. The zone-selective-interlocking system of claim 1 further comprising a controller, wherein the monitoring portion is integrated into the controller.

7. The zone-selective-interlocking system of claim 6, wherein the at least one upstream breaker and the at least one downstream breaker further include an electronic-trip circuit.

8. The zone-selective-interlocking system of claim 1, wherein the monitoring portion of the at least one upstream breaker further measures a signal level of a ZSI signal output of the at least one upstream breaker and determines, based on the measured signal level of the ZSI signal output, that an open circuit condition exists in a zone-selective-interlocking circuit connected to the at least one upstream breaker and another breaker upstream of the at least one upstream breaker.

9. The zone-selective-interlocking system of claim 8, wherein the at least one upstream breaker includes a controller,
   wherein the controller includes respective ON and OFF settings associated with each of the ZSI signal input and the ZSI signal output, and
   wherein an alarm of the at least one upstream breaker is inactive when at least one of the settings is set to OFF.

10. A zone-selective-interlocking system for an electrical power distribution system having at least one upstream breaker and at least one downstream breaker comprising:
    a zone-selective-interlocking circuit connected to the at least one upstream breaker and the at least one downstream breaker; and
    a monitoring portion to verify the connection of the zone-selective-interlocking circuit to the at least one upstream breaker and the at least one downstream breaker,
    wherein the zone-selective-interlocking circuit further includes a zone-selective-interlocking-input circuit at the upstream breaker and a zone-selective-interlocking-output circuit at the downstream breaker, and wherein the monitoring portion further includes a self-test portion, wherein the self-test portion measures a signal sent from the zone-selective-interlocking-output circuit of the at least one downstream breaker to the zone-selective-interlocking-input circuit of the at least one upstream breaker.

11. The zone-selective-interlocking system of claim 10, wherein the self-test portion determines if the measured signal is equal to one of a plurality of predetermined values.

12. The zone-selective-interlocking system of claim 10, wherein the self-test portion determines that there is no connection or an improper connection between the zone-selective-interlocking-output circuit of the at least one downstream breaker and the zone-selective-interlocking-input circuit of the at least one upstream breaker and effects an alarm if the measured signal is equal to a specified one of the plurality of predetermined values.

13. The zone-selective-interlocking system of claim 10, wherein the self-test portion. measures a signal level of the signal sent from the zone-selective-interlocking-output circuit of the at least one downstream breaker to the zone-selective-interlocking-input circuit of the at least one upstream breaker, and determines that a proper connection condition exists between the at least one upstream breaker and the at least one downstream breaker in the zone-selective interlocking circuit based on a measured first signal level and determines that both of a restraint signal is sent from the at least one downstream breaker to the at least one upstream breaker and that said proper connection condition exists based on a measured second signal level.

14. The zone-selective-interlocking system of claim 13, wherein the at least one upstream breaker measures a signal level of a ZSI signal output of the at least one upstream breaker, and determines, based on the measured signal level of the ZSI signal output, that an open circuit condition exists in a zone-selective-interlocking circuit connected to the at least one upstream breaker and another breaker upstream of the at least one upstream breaker.

15. The zone-selective-interlocking system of claim 14, wherein the at least one upstream breaker includes a controller,
   wherein the controller includes respective ON and OFF settings associated with each of the zone-selective-interlocking-input circuit of the at least one upstream breaker and the ZSI signal output of the at least one upstream breaker, and
   wherein an alarm of the at least one upstream breaker is inactive when at least one of the settings is set to OFF.

16. A method of verifying a connection between at least one upstream breaker and at least one downstream breaker in a power distribution system comprising the steps of:
   providing a zone-selective-interlocking system connected to the upstream breaker and the downstream breaker;
   determining, by the downstream breaker, if a controller setting associated with an output of a zone-selective-interlocking circuit at the downstream breaker is set to an ON state;
   measuring, by the downstream breaker, a zone-selective-interlocking system signal at the output;
   determining, by the downstream breaker, that there is an open connection between the upstream breaker and the downstream breaker based on a result of the step of measuring when the controller setting is set to the ON state; and
   effecting an alarm if there is an open connection thereby informing an operator of the open connection.

17. The method of claim 16 further comprising the step of setting the at least one upstream breaker to trip at normal GF and ST time-delay-trip settings.

18. A method of verifying a connection between at least one upstream breaker and at least one downstream breaker in a power distribution system comprising the steps of:
   providing a zone-selective-interlocking system connected to the at least one upstream breaker and the at least one downstream breaker;
   determining if an input or output of a zone-selective-interlocking circuit at the downstream breaker is set to an ON position;
   measuring a zone-selective-interlocking system signal at the input or output;
   determining if there is an open connection between the at least one upstream breaker and the at least one downstream breaker based on the determining and measuring step results; and
   effecting an alarm if there is an open connection thereby informing an operator of the open connection, wherein after the step of determining if there is an open connection between the at least one upstream breaker and the at least one downstream breaker if there is not an open connection the method further comprising the steps of determining if there is a restraint signal sent from a zone-selective-interlocking-output circuit of the at least one downstream breaker to a zone-selective-interlocking-input circuit of the at least one upstream breaker and setting the at least one upstream breaker to trip at normal GF and ST time-delay-trip settings if a restraint signal is determined.

19. The method of claim 18 further comprising the steps of:
   ignoring the GF and ST time-delay-trip settings of the at least one upstream breaker if a restraint signal is not determined.

20. A zone-selective-interlocking (ZSI) system in an electrical power distribution system comprising an upstream breaker and a downstream breaker, the ZSI system comprising:
   a ZSI circuit connected to the upstream breaker and the downstream breaker; and
   a monitoring portion of the upstream breaker to verify the connection of the ZSI circuit to the upstream breaker and the downstream breaker,
   wherein the monitoring portion of the upstream breaker monitors a ZSI signal input of the upstream breaker, and determines that an open circuit condition exists between the upstream breaker and the downstream breaker in the ZSI circuit based a first signal condition of the ZSI signal input, determines that a proper connection condition exists between the upstream breaker and the downstream breaker in the ZSI circuit based on a second signal condition of the ZSI signal input that is different from the first signal condition, and determines that both of a restraint signal is sent from the downstream breaker to the upstream breaker and that said proper connection condition exists based on a third signal condition of the ZSI signal input that is different from the first and second signal conditions.

21. The zone-selective-interlocking system of claim 20, wherein the monitoring portion of the upstream breaker further monitors a ZSI signal output of the upstream breaker and determines, based on a signal condition of the ZSI signal output, that an open circuit condition exists in a ZSI circuit connected to the upstream breaker and another breaker further upstream of the upstream breaker.

22. The zone-selective-interlocking system of claim 21, wherein the upstream breaker includes a controller,
   wherein the controller includes respective ON and OFF settings associated with each of the ZSI signal input and the ZSI signal output, and
   wherein an alarm of the upstream breaker is inactive when at least one of the settings is set to OFF.

* * * * *

UNITED STATES PATENT AND TRADEMARK OFFICE
CERTIFICATE OF CORRECTION

| | |
|---|---|
| PATENT NO. | : 7,570,471 B2 |
| APPLICATION NO. | : 11/676532 |
| DATED | : August 4, 2009 |
| INVENTOR(S) | : Helmut Weiher et al. |

Page 1 of 1

It is certified that error appears in the above-identified patent and that said Letters Patent is hereby corrected as shown below:

Column 7, line 4, please remove the -- . -- after the word "portion" and before the word "measures".

Signed and Sealed this

Seventeenth Day of November, 2009

David J. Kappos
*Director of the United States Patent and Trademark Office*